(12) United States Patent
Jiang et al.

(10) Patent No.: US 11,044,129 B2
(45) Date of Patent: Jun. 22, 2021

(54) HIERARCHICAL COMMUNICATION FOR DEVICE-TO-DEVICE COMMUNICATIONS

(71) Applicant: QUALCOMM Incorporated, San Diego, CA (US)

(72) Inventors: Libin Jiang, Bridgewater, NJ (US); Sudhir Kumar Baghel, Hillsborough, NJ (US); Kapil Gulati, Dover, DE (US); Tien Viet Nguyen, Bridgewater, NJ (US); Shailesh Patil, San Diego, CA (US); Junyi Li, Chester, NJ (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 133 days.

(21) Appl. No.: 16/222,805

(22) Filed: Dec. 17, 2018

(65) Prior Publication Data

US 2019/0199564 A1 Jun. 27, 2019

Related U.S. Application Data

(60) Provisional application No. 62/609,192, filed on Dec. 21, 2017.

(51) Int. Cl.
*H04L 27/26* (2006.01)
*H04W 4/46* (2018.01)
(Continued)

(52) U.S. Cl.
CPC .............. *H04L 27/26* (2013.01); *H04L 1/007* (2013.01); *H04L 1/0011* (2013.01);
(Continued)

(58) Field of Classification Search
None
See application file for complete search history.

(56) References Cited

U.S. PATENT DOCUMENTS

| 7,383,022 | B2 * | 6/2008 | Sebire | H04L 1/0026 |
| | | | | 455/441 |
| 7,933,352 | B2 * | 4/2011 | Choi | H04L 1/0086 |
| | | | | 375/261 |

(Continued)

FOREIGN PATENT DOCUMENTS

| DE | 102015114285 A1 | 3/2017 |
| WO | 2015178851 A1 | 11/2015 |

(Continued)

OTHER PUBLICATIONS

International Search Report and Written Opinion—PCT/US2018/066287—ISA/EPO—dated Mar. 8, 2019.

*Primary Examiner* — Gregory B Sefcheck
(74) *Attorney, Agent, or Firm* — Patterson & Sheridan, L.L.P

(57) ABSTRACT

Certain aspects of the present disclosure provide techniques for hierarchical communication for device-to-device (D2D) communications. In certain aspects, a method generally includes determining user equipment (UE) data comprising at least one of one or more parameters about the UE, one or more parameters about objects near the UE, or raw sensor data. The method further includes determining a first level for transmitting a first portion of the UE data based on content of the first portion of the UE data. The method further includes determining a first modulation coding scheme associated with the first level based on a mapping of a plurality of levels to a plurality of modulation coding schemes. The method further includes encoding the first portion of the UE data using the first modulation coding (Continued)

scheme and transmitting the first portion of the UE data from the UE to at least one second UE directly.

20 Claims, 9 Drawing Sheets

(51) Int. Cl.
| | | |
|---|---|---|
| *H04W 4/70* | (2018.01) | |
| *H04L 29/08* | (2006.01) | |
| *H04W 4/02* | (2018.01) | |
| *H04W 76/14* | (2018.01) | |
| *H04W 4/38* | (2018.01) | |
| *H04B 7/0413* | (2017.01) | |
| *H04W 88/04* | (2009.01) | |
| *H04L 1/00* | (2006.01) | |
| *H04W 92/18* | (2009.01) | |

(52) U.S. Cl.
CPC .......... *H04L 67/322* (2013.01); *H04L 67/327* (2013.01); *H04W 4/023* (2013.01); *H04W 4/027* (2013.01); *H04W 4/38* (2018.02); *H04W 4/46* (2018.02); *H04W 4/70* (2018.02); *H04W 76/14* (2018.02); *H04W 88/04* (2013.01); *H04B 7/0413* (2013.01); *H04W 92/18* (2013.01)

(56) References Cited

U.S. PATENT DOCUMENTS

| | | | | |
|---|---|---|---|---|
| 8,285,291 | B2 * | 10/2012 | Dinan .................. | H04W 36/26 455/443 |
| 8,397,122 | B2 * | 3/2013 | Hong .................. | H04L 1/0006 714/752 |
| 8,520,726 | B2 * | 8/2013 | Kim .................... | H04N 19/182 375/240 |
| 8,805,379 | B2 * | 8/2014 | Tiwari ................. | H04W 36/26 455/443 |
| 9,236,985 | B2 * | 1/2016 | Chen .................... | H04L 1/06 |
| 9,271,244 | B2 * | 2/2016 | Li ......................... | H04W 76/14 |
| 9,325,485 | B2 * | 4/2016 | Li ......................... | H04W 72/04 |
| 9,398,295 | B2 * | 7/2016 | Kim ..................... | H04N 19/67 |
| 9,414,427 | B2 * | 8/2016 | Yang ................... | H04W 76/23 |
| 9,554,394 | B2 * | 1/2017 | Li ........................ | H04L 25/0391 |
| 9,572,186 | B2 * | 2/2017 | Yang ................... | H04W 76/14 |
| 9,584,291 | B2 * | 2/2017 | Tavildar .............. | H04L 5/0073 |
| 9,635,672 | B2 * | 4/2017 | Vasudevan ........... | H04W 76/14 |
| 9,674,847 | B2 * | 6/2017 | Phuyal ................ | H04W 76/14 |
| 9,723,608 | B2 * | 8/2017 | Zhang ................. | H04L 27/2601 |
| 9,832,776 | B2 * | 11/2017 | Peng ................... | H04B 17/345 |
| 9,838,975 | B2 * | 12/2017 | Chae .................... | H04W 52/18 |
| 10,038,484 | B2 * | 7/2018 | Davydov ............. | H04L 1/0027 |
| 10,064,225 | B2 * | 8/2018 | Sachs .................... | H04L 1/0015 |
| 10,154,507 | B2 * | 12/2018 | Byun ................... | H04W 72/046 |
| 10,165,549 | B2 * | 12/2018 | Xu ...................... | H04L 65/4076 |
| 10,172,152 | B2 * | 1/2019 | Chae .................... | H04W 72/10 |
| 10,194,452 | B2 * | 1/2019 | Kalhan ................ | H04W 72/08 |
| 10,206,186 | B2 * | 2/2019 | Song ................... | H04W 52/16 |
| 10,206,211 | B2 * | 2/2019 | Xiao .................... | H04L 27/2636 |
| 10,327,282 | B2 * | 6/2019 | Kazmi ................. | H04W 76/14 |
| 10,412,754 | B2 * | 9/2019 | Khoryaev ........... | H04W 72/1289 |
| 10,419,233 | B2 * | 9/2019 | Bontu .................. | H04L 1/0026 |
| 10,440,669 | B2 * | 10/2019 | Blasco Serrano .... | H04L 1/0001 |
| 10,462,807 | B2 * | 10/2019 | Wallentin ........... | H04W 72/1242 |
| 10,505,686 | B2 * | 12/2019 | Hessler ................ | H04L 1/0005 |
| 10,531,504 | B2 * | 1/2020 | Muraoka ............. | H04W 24/02 |
| 10,687,386 | B2 * | 6/2020 | Pan ....................... | H04W 76/14 |
| 10,736,053 | B2 * | 8/2020 | Ansari ................. | H04W 16/14 |
| 2008/0130616 | A1 * | 6/2008 | Wengerter .......... | H04L 47/2441 370/345 |
| 2010/0303167 | A1 * | 12/2010 | Juang .................. | H04L 27/3488 375/267 |
| 2013/0195026 | A1 * | 8/2013 | Johnsson ............. | H04W 48/16 370/329 |
| 2014/0153390 | A1 * | 6/2014 | Ishii .................... | H04W 52/242 370/230 |
| 2015/0011230 | A1 * | 1/2015 | Noh ..................... | H04W 72/04 455/450 |
| 2015/0172007 | A1 * | 6/2015 | Oketani ................ | H04L 1/1893 370/329 |
| 2015/0305075 | A1 * | 10/2015 | Fodor .................. | H04W 8/005 370/329 |
| 2016/0183319 | A1 * | 6/2016 | Byun ................... | H04W 76/14 370/329 |
| 2018/0035276 | A1 * | 2/2018 | Kang ................... | H04W 76/14 |
| 2018/0255563 | A1 | 9/2018 | Chen et al. | |
| 2019/0319840 | A1 * | 10/2019 | Cheng ................. | H04W 64/00 |
| 2019/0320486 | A1 * | 10/2019 | Khan .................. | G06F 9/45558 |
| 2019/0334834 | A1 * | 10/2019 | Yu ....................... | H04L 5/0051 |
| 2019/0364586 | A1 * | 11/2019 | Li ........................ | H04W 72/04 |
| 2020/0092685 | A1 * | 3/2020 | Fehrenbach ......... | H04B 7/2606 |
| 2020/0106566 | A1 * | 4/2020 | Yeo ..................... | H04W 28/04 |
| 2020/0154449 | A1 * | 5/2020 | Akkarakaran ........ | H04L 5/0053 |
| 2020/0178256 | A1 * | 6/2020 | Tang ................... | H04W 76/14 |
| 2020/0195371 | A1 * | 6/2020 | Tang ................... | H04W 28/0284 |
| 2020/0228147 | A1 * | 7/2020 | Ye ....................... | H03M 13/39 |
| 2020/0235848 | A1 * | 7/2020 | Nguyen ............... | H04B 17/318 |
| 2020/0245319 | A1 * | 7/2020 | Chen ................... | H04L 5/0007 |
| 2020/0260321 | A1 * | 8/2020 | Tang ................... | H04W 28/0289 |
| 2020/0275425 | A1 * | 8/2020 | Cao ..................... | H04W 4/44 |

FOREIGN PATENT DOCUMENTS

| | | |
|---|---|---|
| WO | 2016189496 A1 | 12/2016 |
| WO | 2017003577 A1 | 1/2017 |
| WO | 2017077625 A1 | 5/2017 |

* cited by examiner

HIERARCHICAL COMMUNICATION FOR DEVICE-TO-DEVICE COMMUNICATIONS

CROSS-REFERENCE TO RELATED APPLICATIONS

This application claims the benefit of U.S. Provisional Patent No. 62/609,192, filed Dec. 21, 2017. The content of the provisional application is hereby incorporated by reference in its entirety.

INTRODUCTION

Aspects of the present disclosure relate to wireless communications, and more particularly, to techniques for hierarchical communication for device-to-device (D2D) communications, such as vehicle-to-vehicle (V2V) communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes determining, at a user equipment, utilizing one or more sensors of the user equipment (UE), UE data comprising at least one of one or more parameters about the UE, one or more parameters about objects near the UE, or raw sensor data. The method further includes determining a first level of a plurality of levels for transmitting a first portion of the UE data based on content of the first portion of the UE data. The method further includes determining a first modulation coding scheme associated with the first level based on a mapping of the plurality of levels to a plurality of modulation coding schemes. The method further includes encoding the first portion of the UE data using the first modulation coding scheme. The method further includes transmitting the first portion of the UE data from the UE to at least one second UE directly.

Certain aspects provide a user equipment (UE) including one or more sensors, a memory, and a processor coupled to the memory. The processor is configured to determine, utilizing the one or more sensors, UE data comprising at least one of one or more parameters about the UE, one or more parameters about objects near the UE, or raw sensor data. The processor is further configured to determine a first level of a plurality of levels for transmitting a first portion of the UE data based on content of the first portion of the UE data. The processor is further configured to determine a first modulation coding scheme associated with the first level based on a mapping of the plurality of levels to a plurality of modulation coding schemes. The processor is further configured to encode the first portion of the UE data using the first modulation coding scheme. The processor is further configured to transmit the first portion of the UE data from the UE to at least one second UE directly.

Certain aspects provide a user equipment (UE). The UE includes means for determining, utilizing one or more sensors of the UE, UE data comprising at least one of one or more parameters about the UE, one or more parameters about objects near the UE, or raw sensor data. The UE further includes means for determining a first level of a plurality of levels for transmitting a first portion of the UE data based on content of the first portion of the UE data. The UE further includes means for determining a first modulation coding scheme associated with the first level based on a mapping of the plurality of levels to a plurality of modulation coding schemes. The UE further includes means for encoding the first portion of the UE data using the first modulation coding scheme. The UE further includes means for transmitting the first portion of the UE data from the UE to at least one second UE directly.

Certain aspects provide a non-transitory computer readable storage medium that stores instructions that when executed by a user equipment (UE) cause the UE to perform a method for wireless communication. The method generally includes determining, at a user equipment, utilizing one or more sensors of the user equipment (UE), UE data comprising at least one of one or more parameters about the UE, one or more parameters about objects near the UE, or raw sensor data. The method further includes determining a first level of a plurality of levels for transmitting a first portion of the UE data based on content of the first portion of the UE data. The method further includes determining a first modulation coding scheme associated with the first level based on a mapping of the plurality of levels to a plurality of modulation coding schemes. The method further includes encoding the first portion of the UE data using the first modulation coding scheme. The method further includes transmitting the first portion of the UE data from the UE to at least one second UE directly.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
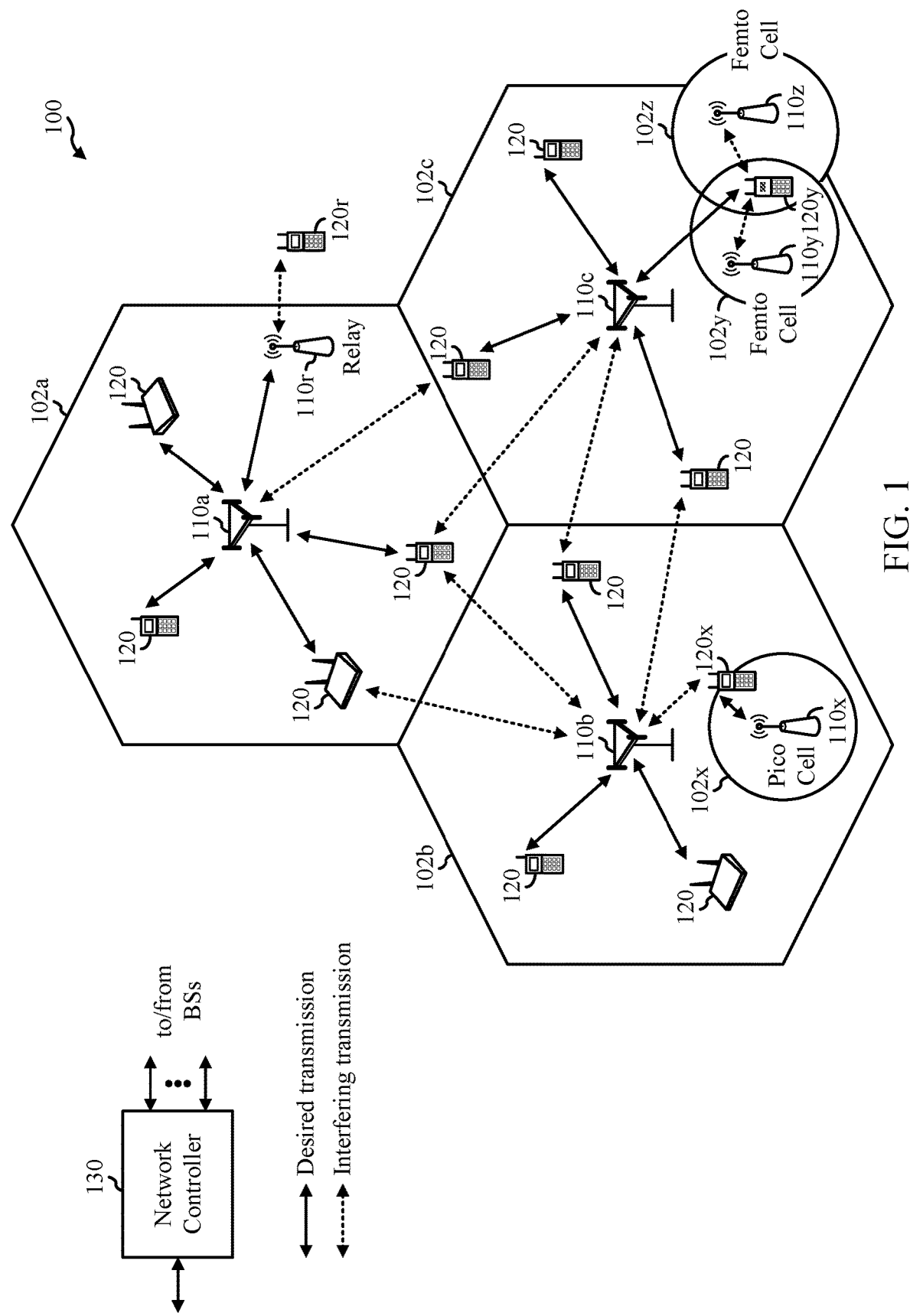
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technologies).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Aspects of the present disclosure relate to hierarchical communications for sidelink communications (e.g., device-to-device communications). As further described herein, sidelink communication may refer to direct communications between user equipments that is not performed via a base station. For example, certain aspects herein may be described with respect to vehicle-to-vehicle (V2V) communications, which is a real world application of sidelink communications. It should be noted, however, though certain aspects are described with respect to V2V communications for ease of explanation and reference to a specific useful implementation, such aspects should not be limited to V2V communications and may be used for other types of sidelink communication.

A modern automobile is a powerful and complex electromechanical system that includes a large number of processors, sensors, and systems-on-chips (SoCs) that control many of the vehicle's functions, features, and operations. More recently, manufacturers have begun equipping automobiles with Advanced Driver Assistance Systems (ADASs) that automate, adapt, or enhance the vehicle's operations. For example, an ADAS may be configured to use information collected from the automobile's sensors (e.g., accelerometer, radar, lidar, geospatial positioning, camera, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated accident avoidance.

Further, vehicles, as an example of user equipments (UEs), may communicate data directly between each other (e.g., using sidelink communications). Based on such V2V communications, one vehicle may utilize data received from another vehicle to control its functions, features, and operations, such as ADAS operations. For example, the vehicle may use the data from another vehicle to enhance "visibility" or detection of neighboring vehicles, of objects detectable by the neighboring vehicles not detectable by the vehicle itself, etc.

In certain aspects, the amount (e.g., size) of data that can be communicated using V2V communications (referred to as V2V data) may be large. For example, a UE (e.g., a vehicle), utilizing the sensors of the UE (e.g., accelerometer, radar, lidar, geospatial positioning, camera, etc.) may determine certain parameters (e.g., position, speed, direction of movement, etc.) about the UE itself (referred to as UE parameters). The UE, utilizing the sensors of the UE may further determine certain parameters (e.g., position, speed, direction of movement, size, etc.) about other objects (e.g., vehicles, pedestrians, roadside objects, buildings, etc.) (referred to as object parameters). The UE, therefore, can communicate one or more UE parameters and/or one or more object parameters to other UEs nearby using V2V communications. Further, the UE may communicate data (e.g., raw data) from the sensors of the UE (e.g., referred to as sensor data), or other appropriate data. Therefore, V2V data may include one or more of one or more UE parameters, one or more object parameters, sensor data from one or more sensors, etc. Accordingly, certain aspects herein relate to more efficient techniques for communicating data (e.g., V2V data) using sidelink communications (e.g., V2V communications).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. UEs 120 may be configured to perform operations and methods described herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
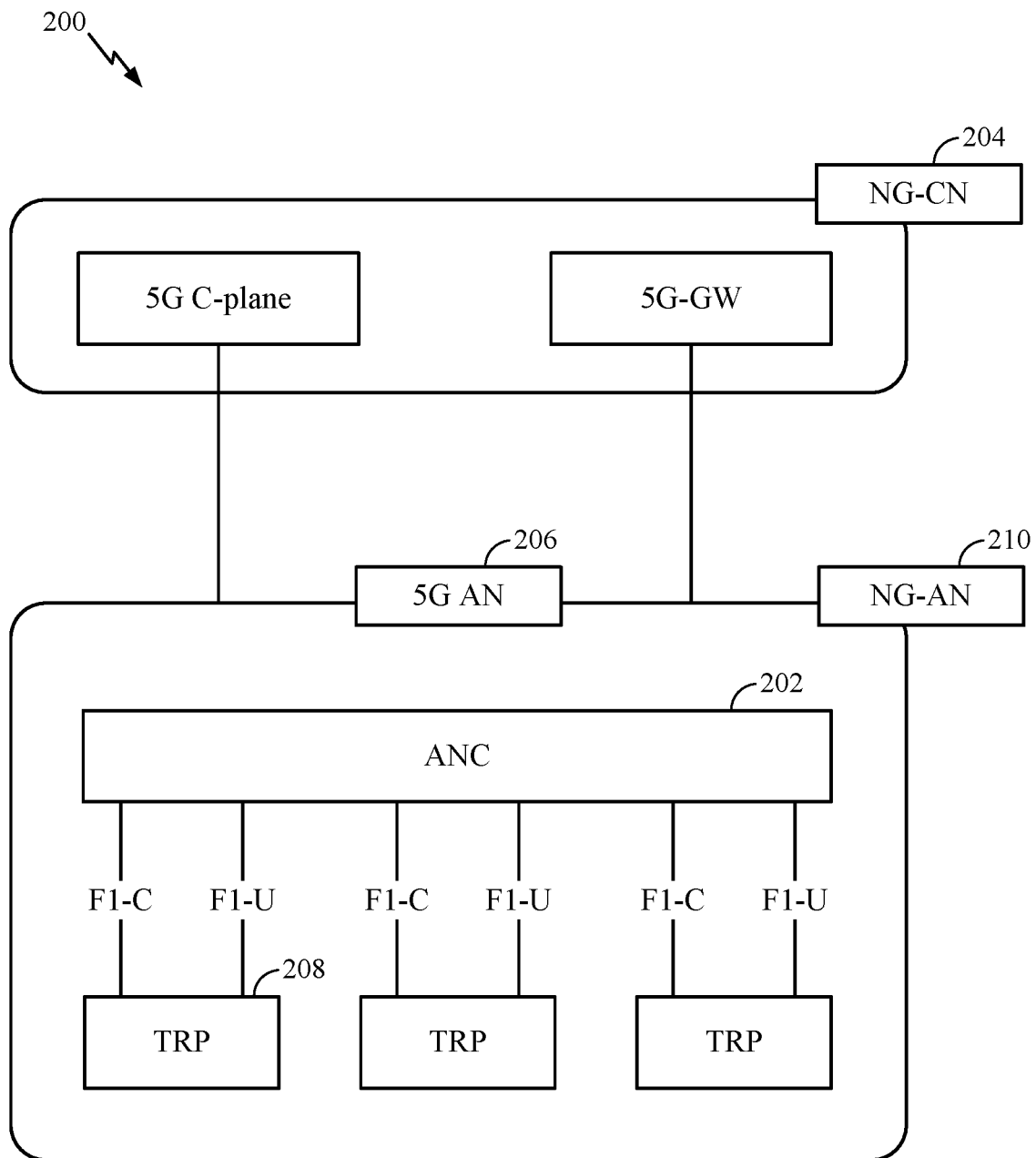
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
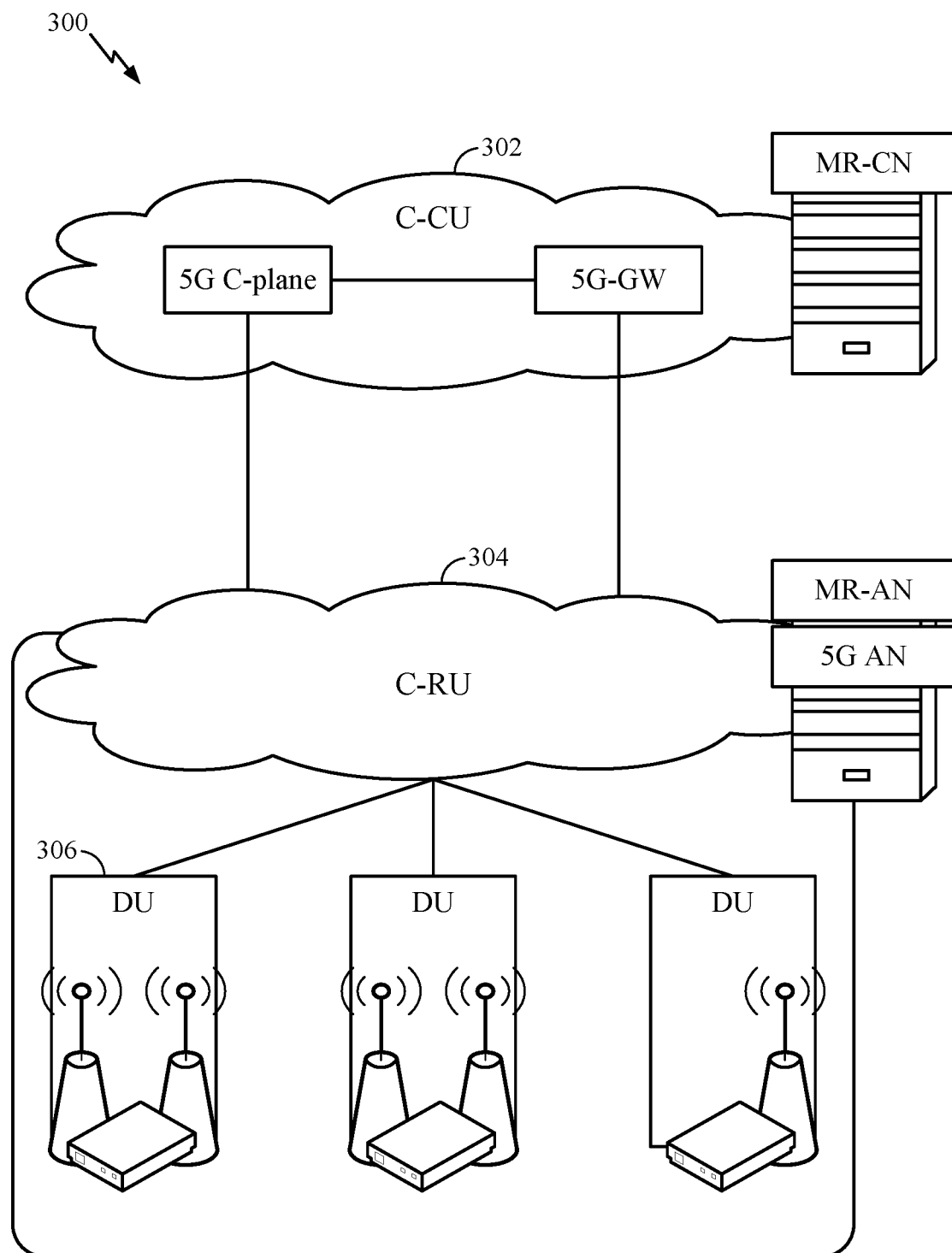
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
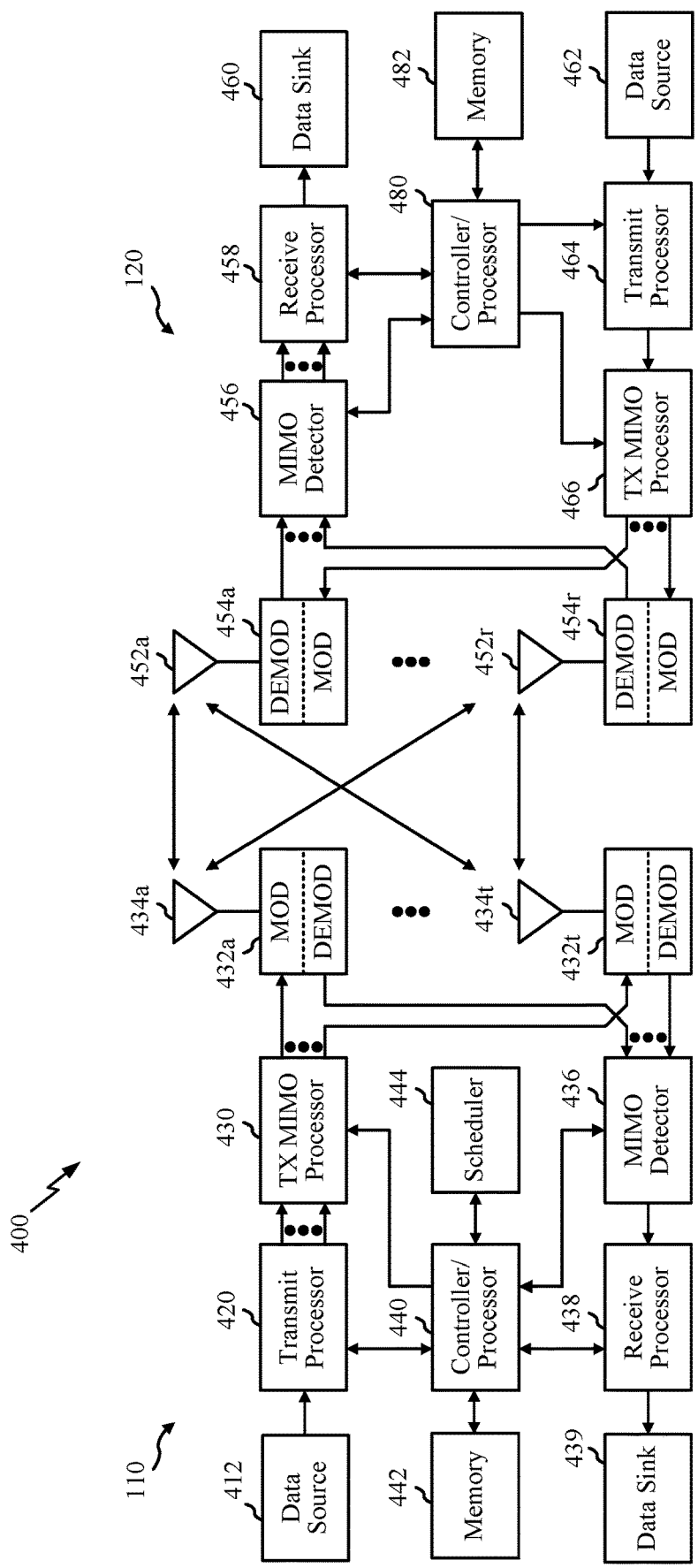
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the UE 120 may be used to practice aspects of the present disclosure. For example, antennas 452, Tx/Rx 454, processors 466, 458, 464, and/or controller/processor 480 of the UE 120 may be used to perform operations described herein and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map)

the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may perform or direct, the execution of processes and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
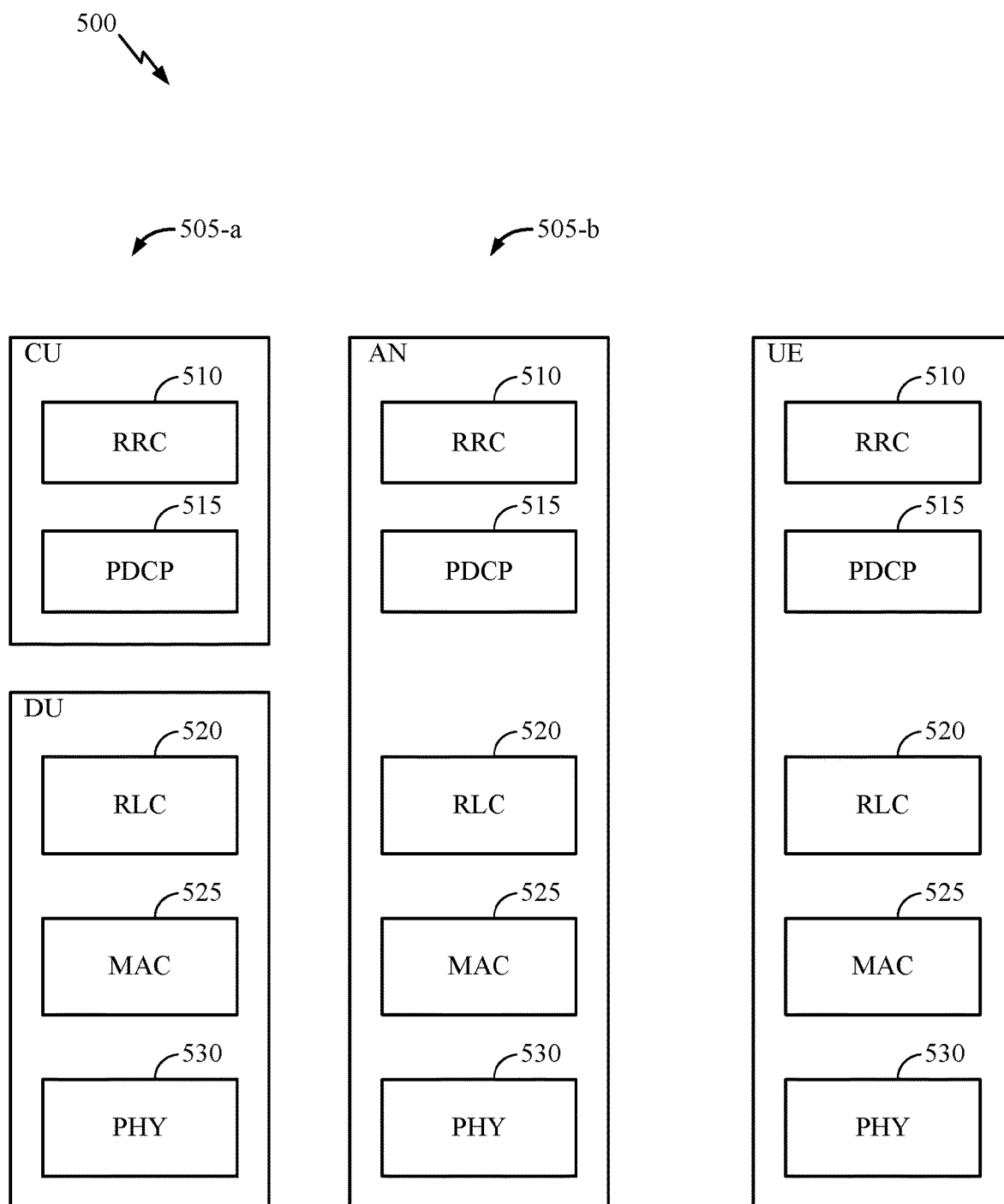
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
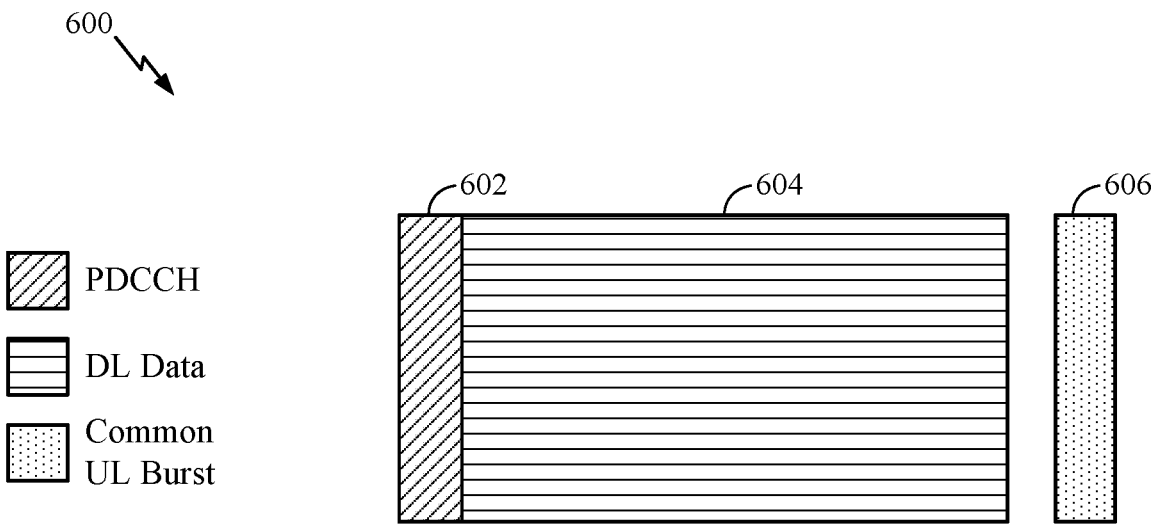
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
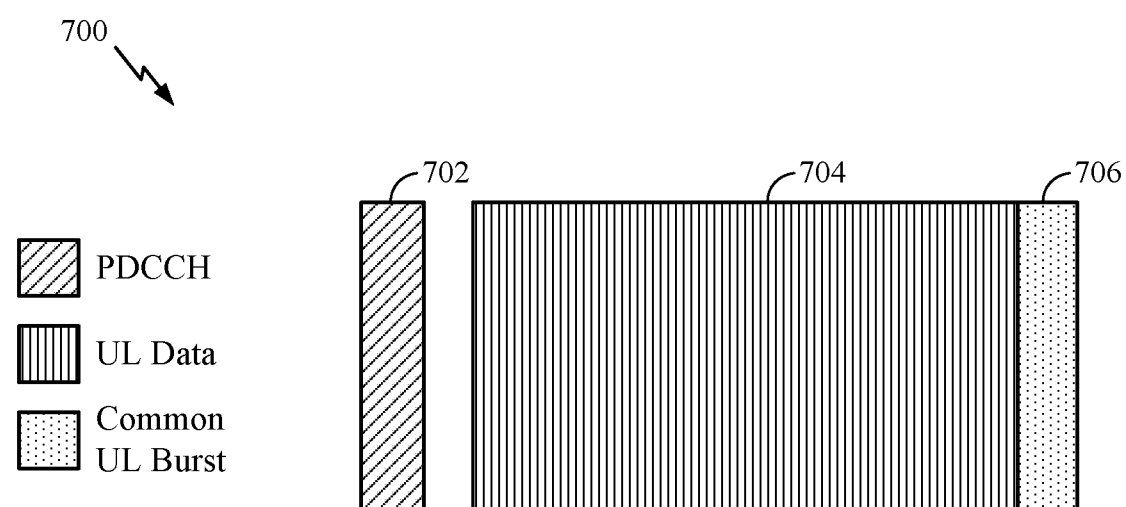
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some instances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Hierarchical Communication

As discussed, UEs 120, e.g., vehicles, may use sidelink signals (e.g., V2V communications) for communicating large amounts of data (e.g., V2V data). Though certain aspects are described with respect to V2V communications for ease of explanation and reference to a specific useful implementation, such aspects should not be limited to V2V communications and may be used for other types of sidelink communication.

Figure 8:
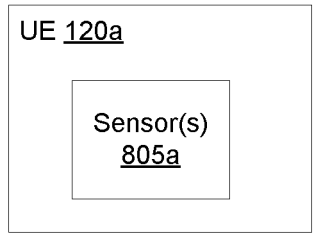
FIG. 8 is a block diagram conceptually illustrating example user equipments, in accordance with certain aspects of the present disclosure.
Figure 8:
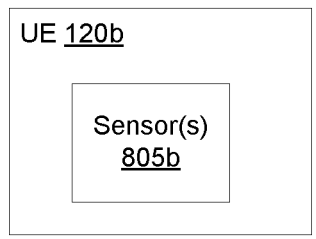
Figure 8:
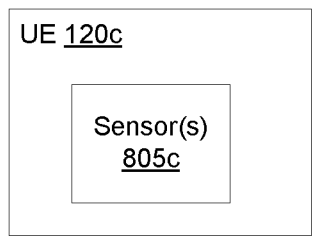
Figure 8:
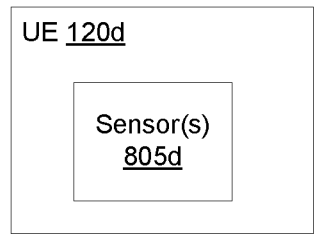

FIG. 8 illustrates an example of UEs 120*a*, 120*b*, 120*c*, and 120*d* corresponding to vehicles configured to communicate using V2V communications, according to aspects described herein. Each of the UEs 120*a*-120*d* may include one or more sensors (e.g., shown as sensors 805*a*-805*d*, respectively), in addition to other components for processing and communicating data (e.g., as described with respect to FIG. 4, for example sensors 805*a*-805*d* may be communicatively coupled with or be an example of data source 462). The one or more sensors 805*a*-805*d* may each include one or more of an accelerometer, radar, lidar, geospatial positioning, camera, etc. Data from the one or more sensors 805*a*-805*d* may be processed, e.g., by processor 480, to generate one or more parameters (e.g., UE parameters and/or object parameters). The one or more parameters and/or raw data from the sensors may be communicated using V2V communications between the UEs 120*a*, 120*b*, 120*c*, and 120*d*, according to certain aspects herein.

In certain aspects, V2V data is divided into a plurality of levels (e.g., different levels corresponding to different priorities for the V2V data). For example, lower levels may contain coarser data, or data of a higher priority. Further, higher levels may contain more detailed data, or data of a lower priority.

In one example, data at a first level (e.g., level 0, lower level, etc.) may include one or more of one or more UE parameters of the UE 120 transmitting the V2V data or position data of one or more objects sensed by sensors 805 of the UE 120 transmitting the V2V data. In certain aspects, the first lower level data does not include the one or more UE parameters of the UE 120 transmitting the V2V data. For example, in certain aspects, UE parameters are not communicated using the techniques (e.g., hierarchical techniques) discussed herein. For example, such one or more UE parameters of the UE 120 transmitting the V2V data may instead be transmitted using other techniques, such as in a basic safety message (BSM) according to V2V communications.

In an example, data at a second level (e.g., level 1, higher level, etc.) may include one or more object parameters such as size, speed, or direction of movement of objects sensed by sensors 805 of the UE 120 transmitting the V2V data. In another example, data at a third level (e.g., level 3, highest level, etc.) may include raw data from one or more sensors 805 of the UE 120 transmitting the V2V data. It should be noted that such plurality of levels of V2V data is only an example and there can be any number (e.g., 2 or more) such levels, and each level may be defined to carry any data.

In certain aspects, the UE 120 is configured to encode V2V data into a codeword for transmission by the UE 120. In certain aspects, the V2V data is encoded into a codeword using a modulation coding scheme (MCS). For example, MCS may be used to determine parameters for encoding data as a codeword and transmitting the codeword using V2V communications. For example, an MCS may indicate parameters such as channel size, number of spatial streams, coding method, modulation technique, guard interval, etc. for encoding and transmitting V2V data as a codeword. These parameters may determine a certain over the air data rate possible for communication using the MCS. Each MCS is a combination of these parameters. Accordingly, in some cases, MCS index values are defined, each corresponding to a certain combination of all these parameters. For example, MCS index values may provide possible combinations of the number of spatial streams, modulation type, and coding rate. In some cases, a certain MCS may be used for communication and serve to strike a balance between maximum possible data rate and maximum acceptable error rate. For example, a lower MCS (e.g., lower index MCS) may have lower maximum possible data rate, but a lower error rate. Further, a higher MCS (e.g., higher index MCS) may have higher maximum possible data rate, but also a higher error rate.

Accordingly, in certain aspects, the UE 120 is configured to map different levels of V2V data to different MCS. For example, lower levels of V2V data may be mapped to lower MCS, and higher levels of V2V data may be mapped to higher MCS. The lower level of V2V data may be coarser, but higher priority data (e.g., more essential), and the higher level V2V data may be more detailed, but lower priority data (e.g., less essential). The UE 120 may use the mapped-to MCS for V2V data to transmit encode and transmit the V2V data.

For example, the UE 120 may use a lower MCS to transmit lower level V2V data at a lower data rate, but with higher reliability. Accordingly, less data may be able to be communicated over the same number of communication resources (e.g., spatial resources, frequency resources, time resources, etc.) as compared to a higher MCS, but the V2V data may be transmitted with enhanced reliability. Therefore, using the lower MCS, the UE 120 may be able to successfully transmit the V2V data over a longer distance (i.e., UEs 120 receiving the transmitted V2V data at further distances may be able to successfully decode the received transmission including the V2V data). Therefore, the UE 120 may use lower MCS to transmit V2V data relevant not only to other nearby UEs 120, but also to further UEs 120. Such data may be coarser data that is smaller in size, so the reduced data rate may be sufficient to communicate the data without utilizing excess communication resources.

In another example, the UE 120 may use a higher MCS to transmit higher level V2V data at a higher data rate, but with lower reliability. Accordingly, more data may be able to be communicated over the same number of communication resources as compared to a lower MCS, but the V2V data may be transmitted with reduced reliability. Therefore, using the higher MCS, the UE 120 may be able to successfully transmit more V2V data over fewer communication resources, but over a shorter distance (i.e., UEs 120 receiving the transmitted V2V data at further distances may not be able to successfully decode the received transmission including the V2V data). Therefore, the UE 120 may use higher MCS to transmit V2V data more relevant only to other nearby UEs 120, but not as relevant to further UEs 120. Such data may be more detailed data that is larger in size, so the higher data rate may be useful to communicate the data without utilizing excess communication resources.

For example, UE 120a may transmit a first V2V data at a first level with a first MCS, second V2V data at a second level with a second MCS, and third V2V data at a third level with a third MCS. The distance between UE 120a and UEs 120b-120d may be in increasing order from UE 120b-120d, where UE 120b is closest to UE 120a and UE 120d is furthest from UE 120a. Accordingly, in certain aspects, UE 120b may be able to receive and successfully decode each of the first V2V data, second V2V data, and the third V2V data. The UE 120c may be able to receive and successfully decode only the second V2V data and the third V2V data. The UE 120d may be able to receive and successfully decode only the third V2V data.

In certain aspects, the UE 120 may use MIMO transmissions for transmitting the V2V data according to the aspects described herein. For example, a MIMO transmission may include a plurality of data layers (e.g., corresponding to different spatial resources/streams using beamforming). In certain aspects, the UE 120 may map different levels of V2V data to different one or more data layers. For example, lower level V2V data may be mapped to fewer data layers and/or different data layers than higher level V2V data by the UE 120. The UE 120 then transmits the V2V data corresponding to a particular level on the mapped-to data layer (e.g., using the mapped-to MCS).

Similarly, the UE 120 may use carrier aggregation, FDM, TDM, or other ways of communicating over different communication resources. The UE 120 map different levels of V2V data to different one or more communication resources. For example, lower level V2V data may be mapped to fewer communication resources and/or different communication resources (e.g., lower frequency bands) than higher level V2V data by the UE 120. The UE 120 then transmits the V2V data corresponding to a particular level on the mapped-to communication resources (e.g., using the mapped-to MCS).

In some aspects, the UE 120 receiving the V2V data may determine the level of the V2V data based on the communication resource(s) (e.g., including data layers) over which the V2V data is received. Accordingly, both the transmitting UE 120 and receiving UE 120 may include mappings of communication resources to levels of V2V data, and/or mappings of MCS to levels of V2V data.

In certain aspects, UE 120a, when transmitting V2V data also transmits a control message associated with the V2V data. The UEs 120b-120d may receive the control message and utilize the control message for decoding the transmitted V2V data. In certain aspects, the UE 120a transmits the control message at substantially the same time (e.g., in the same TTI, subframe, slot, etc.) as the V2V data. In certain aspects, the UE 120a transmits the control message before the V2V data. The control message may indicate one or more configuration parameters of the V2V data transmissions, such as the number of levels used by the UE 120a for V2V data, a number of information bits (e.g., size) of each level of V2V data, a MCS used for each level of V2V data (e.g., a MCS to level mapping), and communication resource(s) used for each level of V2V data (e.g., communication resource(s) to level mapping). The receiving UEs 120b-120d may utilize such information to determine the parameters of the V2V data transmissions received and use the parameters to decode the V2V data transmissions from the UE 120a.

In certain aspects, the UE 120a transmits the control message in a physical sidelink control channel (PSCCH). In certain aspects, the UE 120a transmits the V2V data in a physical sidelink shared channel (PSSCH).

In certain aspects, the UE 120a one or more of broadcasts, multicasts, or unicasts the V2V data. When multicasting or unicasting the V2V data, the UE 120a transmits the V2V data to particular UEs 120 (e.g., UEs 120b-120d), which may be indicated in the V2V data or the control message, or configured via other signaling. Accordingly, when the UE 120a is multicasting or unicasting the V2V data, an intended receiver of the V2V data can send feedback to the UE 120a that transmitted the V2V data (e.g., acknowledgement (ACK) that the V2V data was received and successfully decoded, or negative acknowledgement (NACK) that the V2V data was not received or was received and not successfully decoded).

In certain aspects, the feedback transmitted by the intended receiving UEs 120 is level-specific. In particular, the feedback indicates an ACK/NACK that corresponds to a particular level. For example, if UE 120a transmits first V2V data at a first level and second V2V data at a second level, the UE 120c is an intended recipient of the first V2V data and the second V2V data, and the UE 120c successfully receives and decodes the first V2V data, but not the second V2V data, the UE 120c may transmit feedback information to the UE 120a indicating an ACK for the first V2V data and a NACK for the second V2V data.

In certain aspects, an intended recipient of V2V data may only transmit feedback information for V2V data if it at least received a control message corresponding to the actual V2V data. For example, if an intended recipient UE 120b receives a control message from UE 120a indicating certain V2V data intended for the UE 120b is being transmitted by the UE 120a, but the UE 120b does not receive the V2V data, then the UE 120b can send feedback information indicating a NACK. However, if the UE 120b does not even receive the control message, it does not have information to determine there was V2V data being transmitted, and cannot send feedback information to UE 120a.

In certain aspects, the feedback information transmitted by a UE 120 for V2V data comprises a sequence (e.g., a sequence of a set of orthogonal sequences, such as a Zadoff-Chu sequence). In certain aspects, the feedback information is determined as a function (e.g., hash, lookup table, algorithm, etc.) of one or more of the communication resource(s) over which the V2V data was transmitted/received, the level of the V2V data (e.g., level ID), whether the V2V data was successfully received and decoded or not, and an identifier of the intended receiving UE 120. Each UE 120 (e.g., UE 120a that transmitted the V2V data and the UEs 120b-120d that are intended recipients of the V2V data) may have information regarding the function so they can generate/decode the feedback information. By using sequences (e.g., orthogonal sequences), the UE 120a can receive feedback information transmitted simultaneously (e.g., aggregated over the air) from multiple UEs 120. In certain cases, some UEs 120 may send ACK at the same time that other UEs send NACK. The UE 120a receiving both the ACK and NACK may be able to differentiate between the ACK and NACK as the feedback information may correspond to different sequences.

In certain aspects, the UE 120a transmitting the V2V data can adjust configuration of transmission of the V2V data such as the content included at each level, the MCS used for each level, the mapping of levels to communication resources, other physical-layer configurations, etc. to improve the reception and usefulness of the transmitted V2V data for intended recipient UEs 120b-120d.

In certain aspects, if the UE 120a receives feedback information indicating a NACK, and the feedback information is received with a strong signal strength (e.g., a signal strength above a threshold), the UE 120a may determine the feedback information is received from a nearby UE 120 that could not decode the V2V data, and therefore the UE 120a may reduce the MCS used to transmit (e.g., retransmit) the V2V data to improve reliability of the nearby UE 120 successfully receiving and decoding the V2V data.

In certain aspects, the UE 120a, as discussed, may receive BSMs from other UEs 120. In certain aspects, the UE 120a may determine information about the other UEs 120 and adjust configuration of transmission of the V2V data accordingly. For example, if the BSMs indicate there are no UEs 120 near UE 120a (e.g., within a threshold distance) the UE 120a may only transmit lower level V2V data and not higher level V2V data.

In certain aspects, the UE 120a may utilize its own sensor data to determine information about its surroundings and adjust configuration of transmission of the V2V data accordingly. For example, if the sensor information indicates there are no UEs 120 near UE 120a (e.g., within a threshold distance) the UE 120a may only transmit lower level V2V data and not higher level V2V data.

Figure 9:
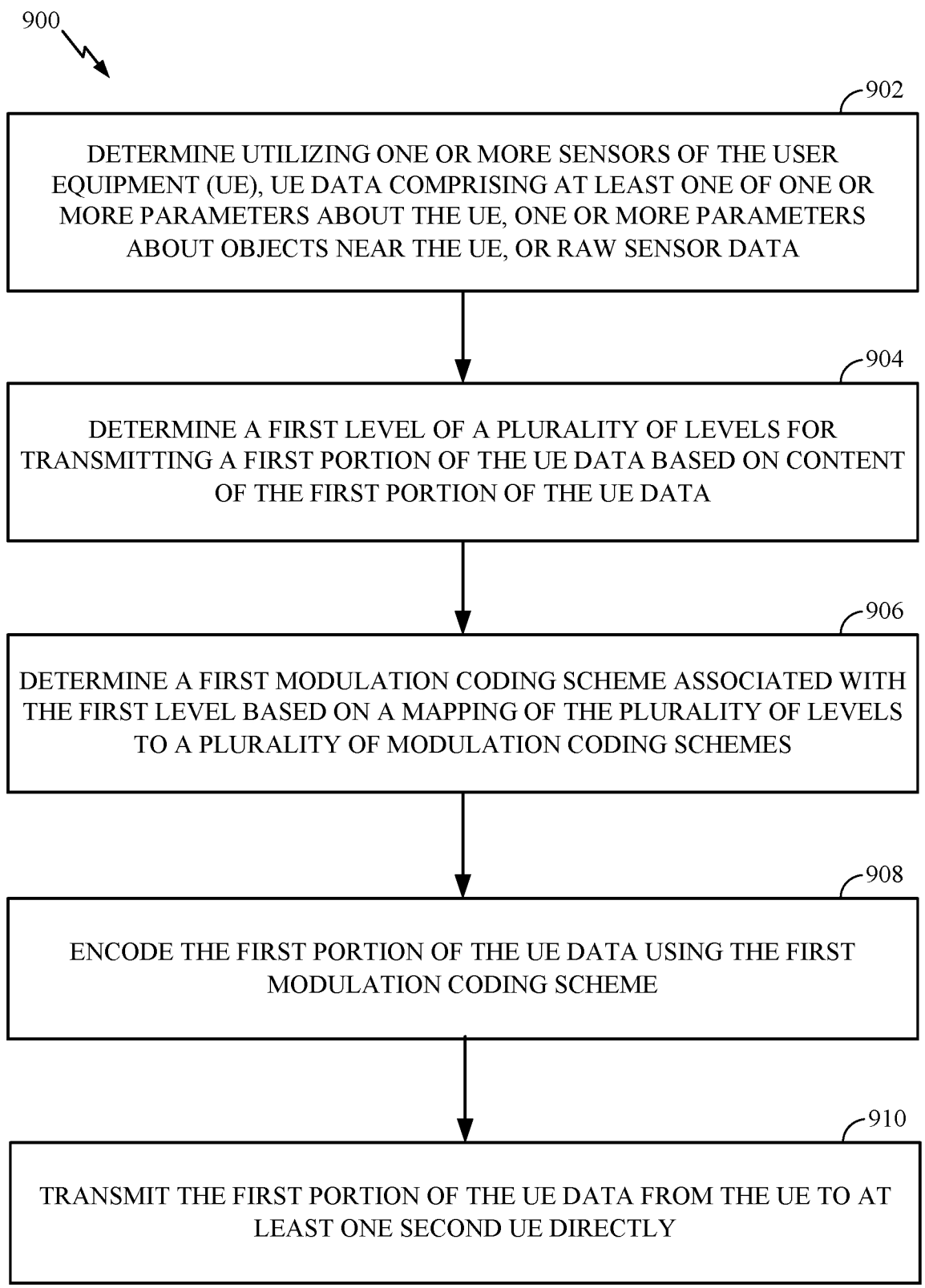
FIG. 9 illustrates example operations that may be performed by a wireless device such as a user equipment (UE) for hierarchical communication, in accordance with aspects of the present disclosure.

FIG. 9 illustrates example operations 900 that may be performed by a wireless device such as a user equipment (UE) for hierarchical communication, in accordance with aspects of the present disclosure.

Operations 900 begin at 902 by a UE determining, utilizing one or more sensors of the UE, UE data (e.g., V2V data) comprising at least one of one or more parameters about the UE (e.g., UE parameters), one or more parameters about objects near the UE (e.g., object parameters), or raw sensor data. At 904, the UE determines a first level of a plurality of levels for transmitting a first portion of the UE data based on content of the first portion of the UE data. At 906, the UE determines a first modulation coding scheme associated with the first level based on a mapping of the plurality of levels to a plurality of modulation coding schemes. A 908, the UE encodes the first portion of the UE data using the first modulation coding scheme. At 910, the UE transmits the first portion of the UE data from the UE to at least one second UE directly.

Figure 10:
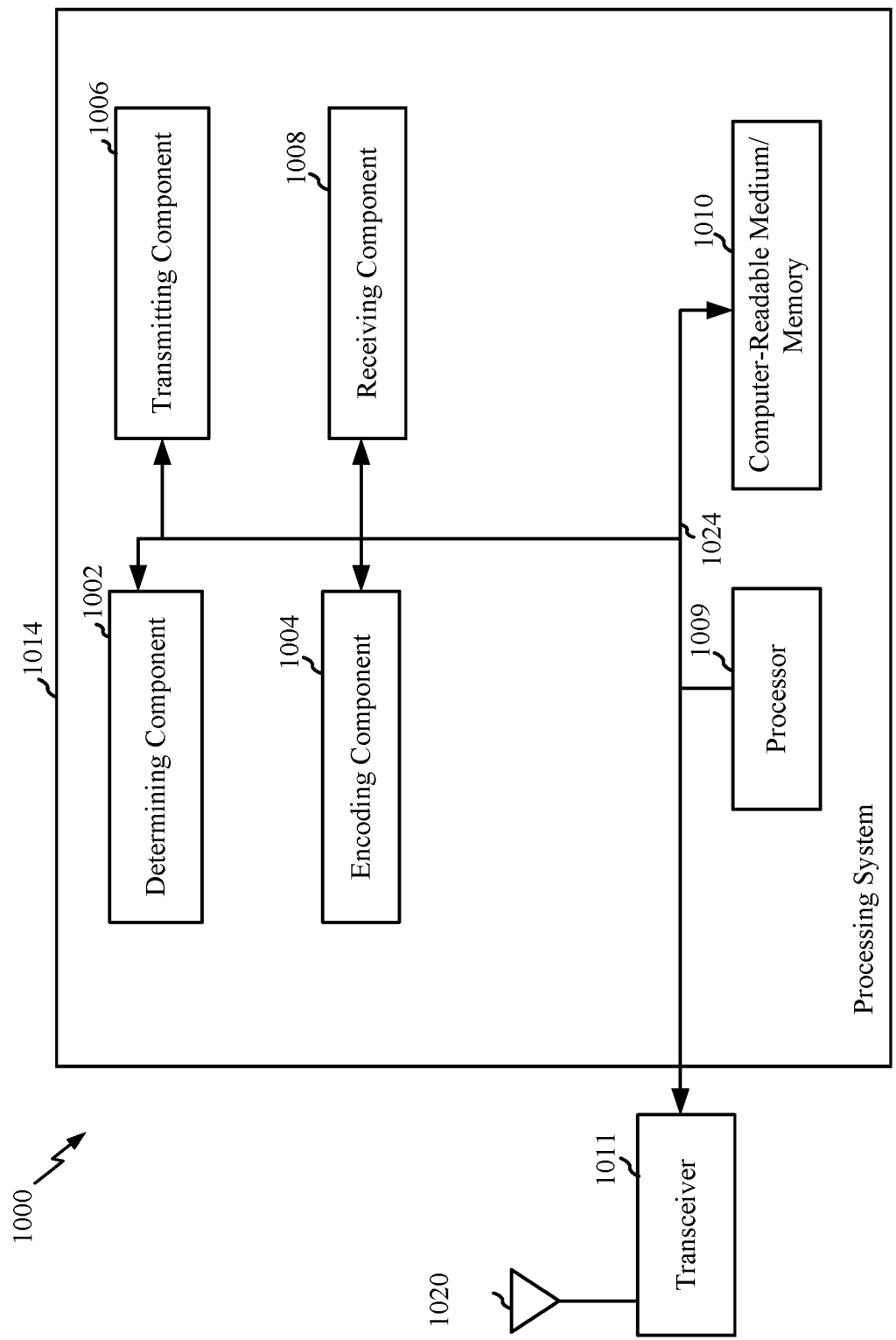
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as one or more of the operations illustrated in FIG. 9. The communications device 1000 includes a processing system 1014 coupled to a transceiver 1011. The transceiver 1011 is configured to transmit and receive signals for the communications device 1000 via an antenna 1020, such as the various signals described herein. The processing system 1014 may be configured to perform processing functions for the communications device 1000, including processing signals received and/or to be transmitted by the communications device 1000.

The processing system 1014 includes a processor 1009 coupled to a computer-readable medium/memory 1010 via a bus 1024. In certain aspects, the computer-readable medium/memory 1010 is configured to store instructions that when executed by processor 1009, cause the processor 1009 to perform one or more of the operations illustrated in FIG. 9, or other operations for performing the various techniques discussed herein.

In certain aspects, the processing system 1014 further includes a determining component 1002 for performing one or more of the operations illustrated at 902-906 in FIG. 9. Additionally, the processing system 1014 includes an encoding component 1004 for performing one or more of the operations illustrated at 908 in FIG. 9. The processing system 1014 also includes a transmitting component 1006 for performing one or more of the operations illustrated at 910 in FIG. 9. The processing system 1014 further includes a receiving component 1008.

The determining component 1002, encoding component 1004, transmitting component 1006, and receiving component 1008 may be coupled to the processor 1009 via bus 1024. In certain aspects, the determining component 1002, encoding component 1004, transmitting component 1006, and receiving component 1008 may be hardware circuits. In certain aspects, the determining component 1002, encoding component 1004, transmitting component 1006, and receiving component 1008 may be software components that are executed and run on processor 1009.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, the method comprising:

determining, at a user equipment (UE), utilizing one or more sensors of the UE, UE data comprising at least one of one or more parameters about the UE, one or more parameters about objects near the UE, or raw sensor data;

determining, at the UE, a first priority level of a plurality of priority levels for transmitting a first portion of the UE data based on content of the first portion of the UE data;

determining, at the UE, a first modulation coding scheme associated with the first priority level based on a mapping of the plurality of priority levels to a plurality of modulation coding schemes;

encoding, at the UE, the first portion of the UE data using the first modulation coding scheme;

determining a second priority level of the plurality of priority levels for transmitting a second portion of the UE data based on content of the second portion of the UE data;

determining a second modulation coding scheme associated with the second priority level based on the mapping of the plurality of priority levels to the plurality of modulation coding schemes;

encoding the second portion of the UE data using the second modulation coding scheme;

mapping the first portion of the UE data to at least a first data layer of a multiple-input multiple-output transmission associated with the first priority level based on a second mapping of the plurality of priority levels to a plurality of data layers;

mapping the second portion of the UE data to at least a second data layer of the multiple-input multiple-output transmission associated with the second priority level based on the second mapping; and transmitting, at the UE, the multiple-input multiple-output transmission from the UE to at least one second UE directly.

2. The method of claim 1, further comprising transmitting a control message to the at least one second UE directly, the control message comprising information indicative of at least one of a number of levels of the plurality of priority levels, a number of information bits in each of the plurality of priority levels, a modulation coding scheme associated with each of the plurality of priority levels, or a mapping of each of the plurality of priority levels to communication resources.

3. The method of claim 1, wherein determining the first priority level of the plurality of priority levels for transmitting the first portion of the UE data based on content of the first portion of the UE data comprises determining the first priority level based on the content of the first portion of the UE data comprising at least one of the one or more parameters about the UE or position data about the objects near the UE, wherein determining the second priority level of the plurality of priority levels for transmitting the second portion of the UE data based on content of the second portion of the UE data comprises determining the second priority level based on the content of the second portion of the UE data comprising at least one of size, speed, or direction of movement of the objects near the UE, and wherein the first modulation coding scheme is lower than the second modulation coding scheme.

4. The method of claim 1, further comprising receiving feedback information from the at least one second UE regarding the first portion of the UE data, the feedback information comprising a sequence that is a function of at least one of a communication resource used for transmitting the first portion of the UE data, an identifier of the first priority level, or whether the at least one second UE successfully received and decoded the first portion of the UE data.

5. The method of claim 1, further comprising:
receiving feedback information from the at least one second UE, wherein the feedback information indicates a negative acknowledgement or reception of the first portion of the UE data;
determining the feedback information is received with a signal strength above a threshold;
encoding the first portion of the UE data using a second modulation coding scheme lower than the first modulation coding scheme based on the signal strength being above the threshold; and
transmitting the first portion of the UE data from the UE to at least one second UE directly using the second modulation coding scheme.

6. The method of claim 1, further comprising:
determining if the at least one second UE is within a threshold distance of the UE; and
determining one or more portions of the UE data to transmit based on whether the at least one second UE is within the threshold distance of the UE.

7. The method of claim 6, wherein determining if the at least one second UE is within the threshold distance of the UE comprises:
receiving a signal from the at least one second UE; and
determining if the signal is received with a signal strength that satisfies a threshold.

8. The method of claim 6, wherein determining if the at least one second UE is within the threshold distance of the UE comprises:
receiving a basic safety message from another UE; and
determining if the basic safety message indicates the at least one second UE is within the threshold distance of the UE.

9. The method of claim 6, wherein determining if the at least one second UE is within the threshold distance of the UE comprises:
utilizing the one or more sensors of the UE to determine if the at least one second UE is within the threshold distance of the UE.

10. A user equipment (UE) comprising:
one or more sensors;
a memory; and
a processor coupled to the memory, the processor being configured to:
determine, utilizing the one or more sensors, UE data comprising at least one of one or more parameters about the UE, one or more parameters about objects near the UE, or raw sensor data;
determine a first priority level of a plurality of priority levels for transmitting a first portion of the UE data based on content of the first portion of the UE data;
determine a first modulation coding scheme associated with the first priority level based on a mapping of the plurality of priority levels to a plurality of modulation coding schemes;
encode the first portion of the UE data using the first modulation coding scheme;
determine a second priority level of the plurality of priority levels for transmitting a second portion of the UE data based on content of the second portion of the UE data;
determine a second modulation coding scheme associated with the second priority level based on the mapping of the plurality of priority levels to the plurality of modulation coding schemes;
encode the second portion of the UE data using the second modulation coding scheme;
map the first portion of the UE data to at least a first data layer of a multiple-input multiple-output transmission associated with the first priority level based on a second mapping of the plurality of priority levels to a plurality of data layers;
map the second portion of the UE data to at least a second data layer of the multiple-input multiple-output transmission associated with the second priority level based on the second mapping; and
transmit the multiple-input multiple-output transmission from the UE to at least one second UE directly.

11. The UE of claim 10, wherein the processor is further configured to transmit a control message to the at least one second UE directly, the control message comprising information indicative of at least one of a number of priority levels of the plurality of priority levels, a number of information bits in each of the plurality of priority levels, a modulation coding scheme associated with each of the plurality of priority levels, or a mapping of each of the plurality of priority levels to communication resources.

12. The UE of claim 10, wherein to determine the first priority level of the plurality of priority levels for transmitting the first portion of the UE data based on content of the first portion of the UE data comprises to determine the first priority level based on the content of the first portion of the UE data comprising at least one of the one or more parameters about the UE or position data about the objects near the UE, wherein to determine the second priority level of the plurality of priority levels for transmitting the second portion of the UE data based on content of the second portion of the UE data comprises to determine the second priority level based on the content of the second portion of the UE data comprising at least one of size, speed, or direction of movement of the objects near the UE, and wherein the first modulation coding scheme is lower than the second modulation coding scheme.

13. The UE of claim 10, wherein the processor is further configured to receive feedback information from the at least one second UE regarding the first portion of the UE data, the feedback information comprising a sequence that is a function of at least one of a communication resource used for transmitting the first portion of the UE data, an identifier of the first priority level, or whether the at least one second UE successfully received and decoded the first portion of the UE data.

14. The UE of claim 10, wherein the processor is further configured to:
   receive feedback information from the at least one second UE, wherein the feedback information indicates a negative acknowledgement or reception of the first portion of the UE data;
   determine the feedback information is received with a signal strength above a threshold;
   encode the first portion of the UE data using a second modulation coding scheme lower than the first modulation coding scheme based on the signal strength being above the threshold; and
   transmit the first portion of the UE data from the UE to at least one second UE directly using the second modulation coding scheme.

15. The UE of claim 10, wherein the processor is further configured to:
   determine if the at least one second UE is within a threshold distance of the UE; and
   determine one or more portions of the UE data to transmit based on whether the at least one second UE is within the threshold distance of the UE.

16. The UE of claim 15, wherein to determine if the at least one second UE is within the threshold distance of the UE comprises to:
   receive a signal from the at least one second UE; and
   determine if the signal is received with a signal strength that satisfies a threshold.

17. The UE of claim 15, wherein to determine if the at least one second UE is within the threshold distance of the UE comprises to:
   receive a basic safety message from another UE; and
   determine if the basic safety message indicates the at least one second UE is within the threshold distance of the UE.

18. The UE of claim 15, wherein to determine if the at least one second UE is within the threshold distance of the UE comprises to:
   utilize the one or more sensors of the UE to determine if the at least one second UE is within the threshold distance of the UE.

19. A user equipment (UE) comprising:
   means for determining, utilizing one or more sensors of the UE, UE data comprising at least one of one or more parameters about the UE, one or more parameters about objects near the UE, or raw sensor data;
   means for determining a first priority level of a plurality of priority levels for transmitting a first portion of the UE data based on content of the first portion of the UE data;
   means for determining a first modulation coding scheme associated with the first priority level based on a mapping of the plurality of priority levels to a plurality of modulation coding schemes;
   means for encoding the first portion of the UE data using the first modulation coding scheme;
   means for determining a second priority level of the plurality of priority levels for transmitting a second portion of the UE data based on content of the second portion of the UE data;
   means for determining a second modulation coding scheme associated with the second priority level based on the mapping of the plurality of priority levels to the plurality of modulation coding schemes;
   means for encoding the second portion of the UE data using the second modulation coding scheme;
   means for mapping the first portion of the UE data to at least a first data layer of a multiple-input multiple-output transmission associated with the first priority level based on a second mapping of the plurality of priority levels to a plurality of data layers;
   means for mapping the second portion of the UE data to at least a second data layer of the multiple-input multiple-output transmission associated with the second priority level based on the second mapping; and
   means for transmitting the multiple-input multiple-output transmission from the UE to at least one second UE directly.

20. A non-transitory computer readable storage medium that stores instructions that when executed by a user equipment (UE) cause the UE to perform a method for wireless communication, the method comprising:
   determining, utilizing one or more sensors of the UE, UE data comprising at least one of one or more parameters about the UE, one or more parameters about objects near the UE, or raw sensor data;
   determining a first priority level of a plurality of priority levels for transmitting a first portion of the UE data based on content of the first portion of the UE data;
   determining a first modulation coding scheme associated with the first priority level based on a mapping of the plurality of priority levels to a plurality of modulation coding schemes;
   encoding the first portion of the UE data using the first modulation coding scheme;
   determining a second priority level of the plurality of priority levels for transmitting a second portion of the UE data based on content of the second portion of the UE data;
   determining a second modulation coding scheme associated with the second priority level based on the mapping of the plurality of priority levels to the plurality of modulation coding schemes;
   encoding the second portion of the UE data using the second modulation coding scheme;
   mapping the first portion of the UE data to at least a first data layer of a multiple-input multiple-output transmission associated with the first priority level based on a second mapping of the plurality of priority levels to a plurality of data layers;
   mapping the second portion of the UE data to at least a second data layer of the multiple-input multiple-output transmission associated with the second priority level based on the second mapping; and
   transmitting the multiple-input multiple-output transmission from the UE to at least one second UE directly.

* * * * *